United States Patent Office 3,481,930
Patented Dec. 2, 1969

3,481,930
XANTHENE AND THIOXANTHENE-9 UREAS AND PROPIONAMIDES
Scott J. Childress, Philadelphia, and Stephen I. Sallay, Wynnewood, Pa., assignors to American Home Products Corporation, New York, N.Y., a corporation of Delaware
No Drawing. Filed Nov. 21, 1966, Ser. No. 595,602
Int. Cl. C07d 87/42, 65/16, 7/42
U.S. Cl. 260—247.2          7 Claims

ABSTRACT OF THE DISCLOSURE

The invention is directed to new xanthenyl derivatives including ureas, amides, sulfonamides, thiosemicarbazides and thiosemicarbazones and a process for their preparation. The compounds have pharmacological activity and they have exhibited anti-cholinergic properties and are particularly useful in anticonvulsants or mydriatic agents.

This invention relates to new and novel xanthene derivatives. In particular, this invention relates to xanthenyl ureas, xanethenyl amides, xanthenyl sulfonamides, xanthenyl thiosemicarbazides, xanthenyl thiosemicarbazones and xanthenamines having pharmacological activity.

The novel compounds which are included within the scope of this invention are represented by the following formula:

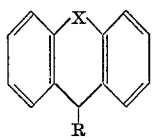

(I)

wherein R is selected from the group consisting of
4-(lower)alkoxycarbonyl-3-(lower)alkylhexahydro-4-phenylazepine-1-carboxamido,
4-(lower)alkoxycarbonyl-3-(lower)alkyl-4-halophenyl-hexahydro-azepine-1-carboxamido,
4-(lower)alkoxycarbonyl-4-(lower)alkoxyphenyl-3-(lower)alkyl-hexahydro-azepine-1-carboxamido,
4-(lower)alkoxycarbonyl-3-(lower)alkyl-4-(lower)alkylphenyl-hexahydro-azepine-1-carboxamido,
4-(lower)alkoxycarbonyl-hexahydro-4-phenylazepine-1-carboxamido,
4-(lower)alkoxycarbonyl-3-(lower)alkyl-4-halophenyl-hexahydro-azepine-1-carboxamido,
4-(lower)alkoxycarbonyl-4-(lower)alkoxyphenyl-hexahydro-azepine-1-carboxamido,
4-(lower)alkoxycarbonyl-4-(lower)alkylphenyl-hexahydro-azepine-1-carboxamido,
4-(lower)alkylpiperazinylthio(lower)alkanoylamido,
di(lower)alkylaminothio(lower)alkanoylamido,
di(lower)alkylamino(lower)alkanoylamido,
pyrrolidinyl(lower)alkanoylamido,
4-(lower)alkylpiperazinyl(lower)alkanoylamido,
piperidino(lower)alkanoylamido,
morpholino(lower)alkanoylamido,
lower alkanoylamido,
halo(lower)alkanoylamido,
lower alkylsulfonamido,
lower alkenylcarbamido,
thiosemicarbazido,
lower alkylideneaminothiocarbamido,
benzylideneaminothiocarbamido,
halobenzylideneaminothiocarbamido,
lower alkylbenzylideneaminothiocarbamido,
lower alkoxybenzylideneaminothiocarbamido,
aminobenzylideneaminothiocarbamido,
cyclo(lowerw)alkylideneaminothiocarbamido, and
naphthomethyleneaminothiocarbamido;

and X is an atom selected from the group consisting of oxygen and sulfur. As used herein the terms "lower alkyl," "lower alkanoyl," "lower alkoxy," and the like, refer to groups having 1 to 6 carbon atoms.

The xanthenyl ureas of the present invention are those compounds represented by Formula I when R is defined as:

4-(lower)alkoxycarbonyl-3-(lower)alkyl-hexahydro-4-phenylazepine-1-carboxamido,
4-(lower)alkoxycarbonyl-3-(lower)alkyl-4-halophenyl-hexahydro-azepine-1-carboxamido,
4-(lower)alkoxycarbonyl-4-(lower)alkoxyphenyl-3-(lower)alkyl-hexahydroazepine-1-carboxamido,
4-(lower)alkoxycarbonyl-3-(lower)alkyl-4-(lower)alkylphenyl-hexahydro-azepine-1-carboxamido,
4-(lower)alkoxycarbonyl-hexahydro-4-phenylazepine-1-carboxamido,
4-(lower)alkoxycarbonyl-3-(lower)alkyl-4-halophenyl-hexahydroazepine-1-carboxamido,
4-(lower)alkoxycarbonyl-4-(lower)alkoxyphenyl-hexahydro-azepine-1-carboxamido,
4-(lower)alkoxycarbonyl-4-(lower)alkylphenyl-hexahydro-azepine-1-carboxamido, and
lower alkenylcarbamido Typical examples thereof are:

1-[N-(9-xanthenyl)carbamoyl]-hexahydro-3-methyl-4-phenylazepine-4-carboxylic acid, ethyl ester;
1-[N-(9-thioxanthenyl)carbamoyl]-hexahydro-3-methyl-4-phenylazepine-4-carboxylic acid, ethyl ester;
1-allyl-3-thioxanthen-9-ylurea and 1-allyl-3-xanthen-9-ylurea The xanthenyl urea compounds of the present invention may be prepared by the interaction of an N,N disubstituted urea with a xanthydrol, as elucidated by the following reaction scheme:

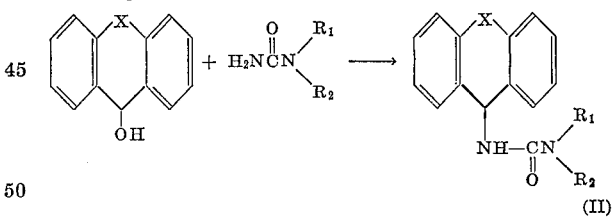

(II)

wherein X is defined as above, R₁ is hydrogen and R₂ is lower alkenyl and when R₁ and R₂ are concatenated they form a cyclic ring selected from the group consisting of 4-(lower)alkoxycarbonyl-3-(lower)alkyl-hexahydro-4-phenylazepinyl,
4-(lower)alkoxycarbonyl-3-(lower)alkyl-4-halophenyl-hexahydroazepinyl,
4-(lower)alkoxycarbonyl-4-(lower)alkoxyphenyl-3-(lower)alkyl-hexahydro-azepinyl,
4-(lower)alkoxycarbonyl-3-(lower)alkyl-4-(lower)alkylphenyl-hexahydro-azepinyl,
4-(lower)alkoxycarbonyl-hexahydro-4-phenylazepinyl,
4-(lower)alkoxycarbonyl-3-(lower)alkyl-4-halophenyl-hexahydro-azepinyl,
4-(lower)alkoxycarbonyl-4-(lower)alkoxyphenyl-hexahydroazepinyl, and
4-(lower)alkoxycarbonyl-4-(lower)alkylphenyl-hexahydro-azepinyl This reaction is conducted in the presence of an alkanoic acid, at a temperature from about 50° C. to about 100°

C. for a period of about one-half hour to about four hours. Preferably, the reaction is conducted in acetic acid. When the reaction is complete, the product (II), a xanthenyl urea, is obtained by conventional methods, for example, filtration and recrystallization from a suitable solvent, such as, an alkanol.

The xanthenyl amides of the present invention are depicted by Formula I when R is defined as:

4-(lower)alkylpiperazinylthio(lower)alkanoylamido,
di(lower)alkylaminothio(lower)alkanoylamido,
di(lower)alkylamino(lower)alkanoylamido,
pyrrolidinyl(lower)alkanoylamido,
4-(lower)alkylpiperazinyl(lower)alkanoylamido,
piperidino(lower)alkanoylamido,
morpholino(lower)alkanoylamido,
lower alkanoylamido, and
halo(lower)alkanoylamido Examples of these compounds are:

3-dimethylamino-N-(9-xanthenyl)thiopropionamide;
N-(9-xanthenyl)-3-dimethylaminopropionamide;
N-(9-xanthenyl)-1-pyrrolidinepropionamide;
N-(9-xanthenyl)-4-methyl-1-piperazinepropionamide bishydrochloride;
N-(9-xanthenyl)-3-piperidinopropionamide;
N-(9-xanthenyl)-4-morpholenepropionamide; and
N-(9-xanthenyl)-3-iodopropionamide The xanthenyl amides of this invention may be prepared by the interaction of vanthydrol with an appropriate acid amide, as illustrated by the following equation:

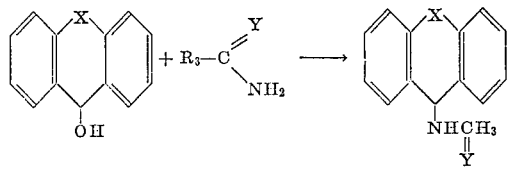

wherein X is defined as above, $R_3$ is selected from the group consisting of 4-(lower)alkylpiperazinylalkyl, di(lower)alkylaminoalkyl, di(lower)alkylamino(lower)alkyl, pyrrolidinyl(lower)alkyl, 4-(lower)alkylpiperazinyl(lower)alkyl, piperidino(lower)alkyl, morpholino(lower)alkyl, lower alkyl and halo(lower)alkyl; and Y is an atom selected from the group consisting of oxygen and sulfur with the proviso that Y is sulfur when $R_3$ is 4-(lower) alkylpiperazinylalkyl and di(lower)alkylaminoalkyl. This reaction is also conducted in the presence of an alkanoic acid, preferably acetic acid, at a temperature of about 100° C. for a period of about one hour to about twenty-four hours. When the reaction is complete, the precipitated product (III), a zanthenyl amide, is separated by routine procedures well known in the art, e.g. filtration and recrystallization from a suitable solvent, such as an alkanol, alkanol-alkane mixtures and alkanol-ether mixtures.

Alternatively, the xanthenyl amides of this invention, with the exception of N-(9-xanthenyl)halo(lower)alkanoylamides, may be prepared by reacting a N-(9-xanthenyl)halo(lower)alkanoylamide with an appropriate amine. This reaction may be conducted in a reaction-inert, water immiscible, organic solvent at about reflux temperatures for a period of about five minutes to about two hours. When the reaction is complete, the product is separated by standard recovery methods, for example, aqueous extraction and subsequent concentration of the organic layer.

The xanthenyl sulfonamides of the present invention are represented by structural formula (I) when R is defined as lower alkylsulfonamido. A typical example is N-(9-xanthenyl)methanesulfonamide. These xanthenyl sulfonamides are prepared by the reaction of a xanthydrol with an appropriate alkylsulfonamide, as exemplified by the following reaction scheme:

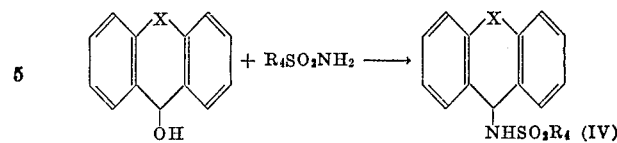

wherein X is defined as above and $R_4$ is lower alkyl. This reaction is conducted in an alkanoic acid, preferably acetic acid, at steam-bath temperature for a period of about one to about ten hours. When the reaction is complete, the product (IV), a xanthenyl sulfonamide, is separated by conventional procedures, for example, concentration and recrystallization.

The xanthenyl thiosemicarbazides of the present invention are represented by formula (I) when R is thiosemicarbazido. These compounds are known as 1-N-(9-xanthenyl)thiosemicarbazide and 1-N-(9-thioxanthenyl)thiosemicarbazide, which may be prepared by the reaction of an appropriate xanthydrol with thiosemicarbazide, as illustrated in the following equation:

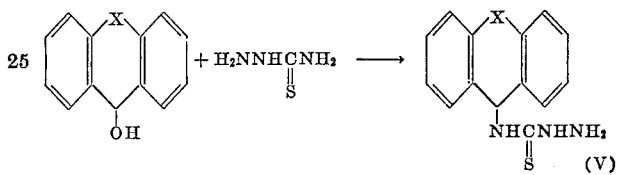

wherein X is defined as above. This reaction is conducted in the presence of an alkanoic acid, preferably acetic acid, at about steam-bath temperature for a period of approximately fifteen hours. When the reaction is complete, the reaction mixture is cooled and the precipitated product (V), a xanthenylthiosemicarbazide is separated by filtration.

The xanthenyl thiosemicarbazones of the present invention are denoted by formula (I) when R is defined as: lower alkylideneaminothiocarbamido, benzylideneaminothiocarbamido, halobenzylideneaminothiocarbamido, lower alkylbenzylideneaminothiocarbamido, aminobenzylideneaminothiocarbamido, cyclo(lower)alkylideneaminothiocarbamido, and naphthomethyleneaminothiocarbamido. Typical examples thereof are: benzaldehyde, 4-(9-xanthenyl) - 3 - thiosemicarbazone; 2 - butanone, 4 - (9-xanthenyl)-3-thiosemicarbazone; 3 - bromobenzaldehyde, 4-(9-thioxanthenyl)-3-thiosemicarbazone; and naphthaldehyde, 4-(9-xanthenyl)-3-thiosemicarbazone.

The xanthenyl thiosemicarbazones herein described may be prepared by the interaction of an above described xanthenyl thiosemicarbazide with an appropriate aldehyde or ketone, as exemplified by the following reaction sequence:

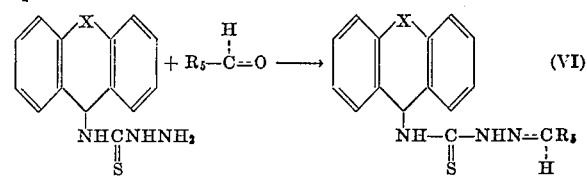

wherein X is defined as above; $R_5$ is selected from the group consisting of lower alkylidene, benzylidene, halobenzylidene, lower alkylbenzylidene, lower alkoxybenzylidene, aminobenzylidene, cyclo(lower)alkylidene, and naphthomethylene; and the grouping:

represents an optional double bond and hydrogen atom, thus depicting either the aldehydic or ketonic reactant and product. This reaction may be conducted in an alkanol solvent at about reflux temperatures for a period of about one-half hour to about twenty hours. Alternatively, when the reactants are liquids they may be reacted in the absence of a solvent. When the reaction is complete, the reaction mixture is cooled and the resulting product (VI), a xanthenyl thiosemicarbazone, is separated by filtration. Further, purification of this product may be accomplished by recrystallization from a suitable solvent, e.g. an alkanol.

Many of the starting compounds utilized in the preparation of the xanthene derivatives of the present invention are known to compounds which are readily available from commercial sources, while others can easily be prepared in accordance with standard organic procedures well known to those skilled in the art. The 1-carbamoyl-azepine-4-carboxylic acid ester reactants employed herein are prepared by the method described in copending application "Substituted Hexahydro-4-Phenylazepine-4-Carboxylic Acid Esters," Ser. No. 410,716, filed on Nov. 12, 1964 and now abandoned in favor of continuation-in-part application Ser. No. 707,898, filed Nov. 6, 1967. Further, the dialklaminothioalkanolamide starting materials are prepared and described in copending and co-filed application "Aminothioamides," Ser. No. 595,603, filed on Nov. 21, 1966.

Since many of the nitrogen containing compounds of the present invention are basic, advantage may be taken of the water solubility of salts of these compounds formed with acids in the isolation and/or purification of the above compounds for oral or parenteral administration. Of course, only salts formed with pharmaceutically-acceptable acids should be employed in therapeutic applications. Particularly effective salts are those formed with pharmaceutically-acceptable acids having a pH value of 3 or lower. Such acids are well-known in the art, for example, hydrochloric, hydrobromic, hydroiodic, sulfuric, nitric, phosphoric, acetic, lactic, citric, tartaric, maleic, gluconic, fumaric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

In accord with the present invention, the xanthene derivatives of the present invention, with the exception of the N - (9 - xanthenyl)-haloalkanoylamides, have been found to possess interesting pharmaceutical properties which render them useful as synthetic medicinals. More particularly, these compounds, in standard pharmacological tests, have exhibited utilities as tranquilizers and anticonvulsants.

The N-(9-xanthenyl)-haloalkanoylamides of this present invention are useful as intermediates in the preparation of xanthenyl amides.

When the xanthene derivatives of this invention, with the exception of the N-(9-xanehenyl)-haloalkanoylamides are employed as transquilizers and anticonvulsants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intraveneously or subcutaneously. For parenteral administration they may be used in the form of a sterile solution containing other solutes, for example, enough saline or glucose to make the solution isotinic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 50 mg. to about 200 mg. per day is most desirably employed in order to achieve effective results.

The following examples are given by way of illustration.

EXAMPLE I

Xanthydrol (0.99 g., 5 mole) and 1-carbamoyl-hexahydro-3-methyl-4-phenylazepine-4-carboxylic acid, ethyl ester (1.52 g., 5 mmole) are dissolved in 10 ml. of acetic acid and heated to 70° C. for one hour. The solid precipitate which develops is separated by filtration and is 1-[N-(9-xanthenyl)-carbamoyl]-hexahydro-3 - methyl-4-phenylazepine-4-carboxylic acid, ethyl ester, M.P. 239–241° C.

Analysis.—Calc'd for $C_{30}H_{32}O_4N_2$: C, 74.35; H, 6.66; N, 5.78. Found: C, 74.12; H, 6.70; N, 5.72.

In a similar manner, 3-methyl-1-carbamoyl-hexahydro-4-phenylazepine-4-carboxylic acid, methyl ester is reacted with xanthydrol to produce 3-methyl-1-[N-(9-xanthenyl)-carbamoyl]-4-phenylazepine - 4 - carboxylic acid, methyl ester.

EXAMPLE II 1-carbamoyl - hexahydro - 3 - methyl - 4 - phenylazepine-4-carboxylic acid, ethyl ester (10 m. mole) and thioxanthydrol (10 mmole) are dissolved in acetic acid (20 ml.) and heated to 50° C. for one hour. Thereafter, the resulting precipitate is filtered and recrystallized from chloroform-methanol to yield 1-[N - (9 - thioxanthenyl)-carbamoyl] - hexahydro - 3 - methyl - 4 - phenylazepine-4-carboxylic acid, ethyl ester, M.P. 208–211° C.

Analysis.—Calc'd for $C_{30}H_{32}O_3N_2S$: C, 71.97; H, 6.44; N, 5.59. Found: C, 71.72; H, 6.30; N, 5.25.

EXAMPLE III

Xanthydrol (50 m.mole) and 4-(4-bromophenyl)-1-carbamoyl-hexahydro-3-methylazepine-4 - carboxylic acid, methyl ester (50 m.mole) are dissolved in 100 ml. of propionic acid and heated to 100° C. for one-half hour. The resulting precipitate is filtered to yield 4-(4-bromophenyl)-1-[N-(9 - xanthenyl)carbamoyl] - hexahydro - 3-methylazepine-4-carboxylic acid, methyl ester.

In a similar manner, the following compounds are obtained:

1-[-(9-xanthenyl)-carbamoyl] - 4 - (3 - chlorophenyl)-hexahydro-3-methylazepine-4-carboxylic acid, ethyl ester;
1-[N-(9-xanthenyl)carbamoyl]-3-methyl-4-(4 - fluorophenyl)-hexahydro-azepine-4-carboxylic acid, butyl ester.

EXAMPLE IV

Thioxanthydrol (5 mmole) and 1-carbamoylhexahydro-4-(4-methoxyphenyl)-3-methylazepine - 4 - carboxylic acid, methyl ester (5 mmole) are dissolved in acetic acid (10 ml.) and heated to 50° C. for four hours. Thereafter, the resulting precipitate is filtered and recrystallized from chloroform-methanol to yield 1-[N-(9-thioxanthenyl)-carbamoyl]-hexahydro-4-(4-methoxyphenyl) - 3 - methyl-azepine-4-carboxylic acid, methyl ester.

Repeating the aforesaid procedure, xanthydrol is reacted with 1-carbamoyl-3-methyl-hexahydro-4-(4-ethoxyphenyl)-azepine-4-carboxylic acid, ethyl ester to synthesize 1-[N-(9-xanthenyl)-carbamoyl]-3 - methyl - hexahydro-4-(4-ethoxyphenyl)-azepine-4-carboxylic acid, ethyl ester.

EXAMPLE V

Xanthydrol (15 mmole) and 1-carbamoyl-hexhydro-3-methyl-4-(4-tolyl)-azepine-4-carboxylic acid, ethyl ester (15 mmole) are dissolved in 30 ml. of acetic acid and heated to 50° C. for five hours. Thereafter, the resulting solid is separated by filtration to obtain 1-[N-(9-canthenyl)-carbamoy]-hexahydro-3-methyl-4-(4-tolyl) - azepine-4-carboxylic acid, ethyl ester.

In a similar manner, the following compounds are obtained:

1-[N-(9-thioxanthenyl)-carbamoy] - 3 - methyl - 4 - (4-tolyl)-hexahydro-azepine-4-carboxylic acid, methyl ester;

1-[N-(9-xanthenyl)-carbamoyl]-3-methyl - hexahydro-4-(4-tolyl)-azepine-4-carboxylic acid, propyl ester; and 1-[N-(9 - thioxanthenyl) - carbamoyl] - hexahydro - 3-methyl-4-(3-tolyl)-azepine-4-carboxylic acid, ethyl ester.

EXAMPLE VI

The procedure described in Examples I to V is repeated reacting the hereinafter listed 1-carbamoyl-hexahydro-4-phenylazepine-4-carboxylic acid esters with xanthydrol or thioxanthydrol to synthesize the following products:

| Reactants | Products |
| --- | --- |
| 1-carbamoylhexahydro-4-phenyl-azepine-4-carboxylic acid, ethyl ester and xanthydrol. | 1-[N-(9-xanthenyl)-carbamoyl]-hexahydro-4-phenylazepine-4-carboxylic acid, ethyl ester. |
| 1-carbamoylhexahydro-4-phenyl-azepine-4-carboxylic acid, methyl ester and thioxanthydrol. | 1-[N-(9-thioxanthenyl)-carbamoyl]-hexahydro-4-phenyl-azepine-4-carboxylic acid, methyl ester. |
| 4-(4-bromophenyl)-1-carbamoyl-hexahydro-azepine-4-carboxylic acid, methyl ester and xanthydrol. | 4-(4-bromophenyl)-1-[N-(9-xanthenyl)carbamoyl]-hexahydro-azepine-4-carboxylic acid, methyl ester. |
| 1-carbamoyl-4-(3-chlorophenyl) hexahydro-azepine-4-carboxylic acid, ethyl ester and xanthydrol. | 1-[N-(9-xanthenyl)-carbamoyl]-4-(3-chlorophenyl)-hexahydro-azepine-4-carboxylic acid, ethyl ester. |
| 1-carbamoyl-hexahydro-4-(4-methoxyphenyl)-azepine-4-carboxylic acid, methyl ester and thioxanthydrol. | 1-[N-(9-thioxanthenyl)-carbamoyl]-hexahydro-4-(4-methoxyphenyl)-azepine-4-carboxylic acid, methyl ester. |
| 1-carbamoyl-hexahydro-4-(4-ethoxyphenyl)-azepine-4-carboxylic acid, ethyl ester and xanthydrol. | 1-[N-(9-xanthenyl)-carbamoyl]-hexahydro-4-(4-ethoxyphenyl)-azepine-4-carboxyic acid, ethyl ester. |
| 1-carbamoyl-4-(3-ethoxyphenyl)-hexahydro-azepine-4-carboxylic acid, butyl ester and xanthydrol. | 1-[N-(9-xanthenyl)-carbamoyl]-4-(ethoxyphenyl)-hexahydro-azepine-4-carboxylic acid, butyl ester. |
| 1-carbamoylhexahydro-4-(4-tolyl)-azepine-4-carboxylic acid, ethyl ester and xanthydrol. | 1-[N-(9-xanthenyl)-carbamoyl]-hexahydro-4-(4-tolyl)-azepine-4 carboxylic acid, ethyl ester. |
| 1-carbamoyl-4-(4-tolyl)-hexahydro-azepine-4-carboxylic acid methyl ester and thioxanthydrol. | 1-[N-(9-thioxanthenyl)-carbamoyl 4-carboxylic acid, methyl ester. |
| 1-carbamoyl-4-(4-tolyl)-hexahydro-azepine-4-carboxylic acid, propyl ester and xanthydrol. | 1-[N-(9-xanthenyl)-carbamoyl]-hexahydro-4-(4-tolyl)-azepine-4-carboxylic acid, propyl ester. |

EXAMPLE VII

Allylurea (5 mmole) and thioxanthydrol (5 mmole) are added to acetic acid (10 ml.) and heated at 50° C. for one hour. When the reaction is complete, the reaction mixture is cooled and the resulting crystals are recrystallized from isopropyl alcohol to afford 1-allyl-3-thioxanthen-9-ylurea, M.P. 232.5–233.5° C.

Analysis.—Calc'd for $C_{17}H_{16}N_2OS$: C, 68.89; H, 5.44; N, 9.45. Found: C, 68.63; H, 5.22; N, 9.19.

Similarly, reacting 2-butenylurea with thioxanthydrol there is produced 1-(2-butenyl)-3-thioxanthen-9-ylurea.

EXAMPLE VIII

Xanthydrol (0.99 g., 5 mmole) and allylurea (0.5 g., 5 mmole) are dissolved in 10 ml. of acetic acid and heated on a steam bath for one hour. The solid which separates is collected, washed with petroleum ether to yield 1.9 g. of 1-allyl-3-xanthen-9-ylurea, M.P. 236.5–237.5° C.

Analysis.—Calc'd for $C_{17}H_{16}O_2N_2$: C, 72.84; H, 5.75; N, 9.99. Found: C, 72.64; H, 5.98; N, 9.71.

EXAMPLE IX

Xanthydrol (3 c. mole) and β-iodopropionamide (3 c. mole) are dissolved in 35 ml. of acetic acid and heated on a steam bath for five hours. The resulting precipitate is filtered and washed with petroleum ether and then recrystallized from ethanol to afford N-(9-xanthenyl)-3-iodo-propionamide, M.P. 188.5–189.0° C.

Analysis.—Calc'd for $C_{16}H_{14}O_2NI$: C, 50.65; H, 3.72; N, 3.69. Found: C, 50.60; H, 3.60; N, 3.83.

Similarly, the following compounds are obtained:

N-(9-thioxanthenyl)-2-chloroacetamide;
N-(9-xanthenyl)-4-bromobutyramide;
N-(9-thioxanthenyl)-5-iodovaleramide; and
N-(9-xanthenyl)-6-chlorocaproamide.

EXAMPLE X

N-(9-xanthenyl)-3-iodopropionamide (3 c. mole), as prepared in Example IX, is dissolved in 75 ml. of chloroform and mixed with 6 ml. of piperidine. The reaction mixture is boiled for ten minutes, cooled and extracted with water. The chloroform layer is separated, and dried to an oil under vacuum (0.005 m./50–70° C.). The oil residue is then reacted with hydrochloric acid to afford N-(9-xanthenyl)-1-piperidinepropionamide hydrochloride, M.P. 215.5–216.5° C.

Analysis.—Calc'd for $C_{21}H_{25}O_2N_2Cl$: C, 67.65; H, 6.76; N, 7.51; Cl, 9.51. Found: C, 67.45; H, 6.69; N, 7.55; Cl, 9.20.

Similarly, the following compounds are prepared:

N-(9-thioxanthenyl)-1-piperidinepropionamide;
N-(9-xanthenyl)-1-piperidinebutyramide;
N-(9-thioxanthenyl)-1-piperidinevaleramide; and
N-(9-xanthenyl)-1-piperidinecaproamide.

EXAMPLE XI

Employing the procedure of Example X, N-(9-xanthenyl)-3-iodopropionamide is reacted with morpholine to yield N-(9-xanthenyl)-4-morpholinepropionamide, M.P. 194–196° C.

Analysis.—Calc'd for $C_{20}H_{22}O_3N_2$: C, 70.98; H, 6.55; N, 8.28. Found: C, 70.85; H, 6.59; N, 8.17.

Similarly, reacting N-(9-thioxanthenyl)-2-chloroacetamide with morpholine affords N-(9-thioxanthenyl)-4-morpholineacetamide.

EXAMPLE XII

Repeating the procedure of Example X, N-(9-xanthenyl)-3-iodopropionamide is reacted with pyrrolidine to afford N-(9-xanthenyl)-1-pyrrolidinepropionamide, M.P. 178–179° C.

Analysis.—Calc'd for $C_{20}H_{22}O_2N_2$: C, 74.51; H, 6.88; N, 8.69. Found: C, 74.46; H, 6.99; N, 8.83.

In the same manner, reacting N-(9-thioxanthenyl)-5-iodovaleramide with pyrrolidine there is obtained N-(9-thioxanthenyl)-1-pyrrolidinevaleramide.

EXAMPLE XIII

N-(9-xanthenyl)-3-iodopropionamide (6 c. mole), as prepared in Example IX, is dissolved in 150 ml. of chloroform and mixed with 12 ml. of N-methylpiperazine. The resulting mixture is heated to reflux for fifteen minutes, cooled and then extracted with water. The chloroform layer is separated, dried and evaporated under reduced pressure. The residue is reacted with 1N hydrochloric acid to afford N-(9-xanthenyl)-4-methylpiperazine-propionamide bishydrochloride, M.P. 143.5–145° C. when recrystallized from ethanol.

Similarly, reacting N-(9-thioxanthenyl)-2-chloroacetamide with N-methylpiperazine affords N-(9-xanthenyl)-4-methyl-1-piperazineacetamide.

EXAMPLE XIV

N-(9-xanthenyl)-3-iodopropionamide (12 c. mole), as prepared in Example IX, is dissolved in 300 ml. of dichloromethane and admixed with 25 ml. of dimethylamine. The reaction mixture is then refluxed for ten minutes, cooled and extracted with water. The dichloromethane layer is separated, dried and evaporated under vacuum. The residue is recrystallized from ethylacetate-hexane to yield N-(9-xanthenyl)-3-dimethylaminopropionamide, M.P. 151–152° C.

*Analysis.*—Calc'd for $C_{18}H_{20}O_2N_2$: C, 72.95; H, 6.80; N, 9.45. Found: C, 73.20; H, 7.12; N, 9.56.

EXAMPLE XV

Employing the procedure of Example XIV to react the hereinafter listed reactants, the following amide products are obtained:

| Reactants | Products |
| --- | --- |
| N-(9-thioxanthenyl)-2-chloroacetamide and diethylamine | N-(9-thioxanthenyl)-2-diethylaminoacetamide. |
| N-(9-xanthenyl)-4-bromobutyramide and dibutylamine | N-(9-xanthenyl)-4-dibutylaminobutyramide. |
| N-(9-thioxanthenyl)-5-iodovaleramide and ethylpropylamine | N-(9-thioxanthenyl)-5-ethylpropylaminovaleramide. |
| N-(9-xanthenyl)-6-chlorocaproamide and dimethylamine | N-(9-xanthenyl)-6-dimethylaminocaproamide. |

EXAMPLE XVI

Xanthydrol (1 c. mole) and β-dimethylaminoamide (1 c. mole) in acetic acid (2 ml.) are heated on a steam bath for fifteen hours. When the reaction is complete, the reaction mixture is admixed with 100 ml. of benzene and the resulting precipitate collected by filtration. The product is then reacted with 1N hydrochloric acid to afford N-(9-xanthenyl)-3-dimethylaminothiopropionamide hydrochloride, M.P. 190.5–191° C. when crystallized from ethanol-ether.

*Analysis.*—Calc'd for $C_{18}H_{20}N_2OS \cdot HCl$: C, 61.96; H, 6.07; N, 8.04; S, 9.20. Found: C, 62.05; H, 6.13; N, 8.16; S, 9.10.

Similarly, N-(9-thioxanthenyl)-4-diethylaminothiobutyramide; N-(9-xanthenyl)-2-dibutylaminothioacetamide and N-(9-thioxanthenyl)-5-dimethylaminothiovaleramide are produced.

In the same manner, reacting 4-methyl-piperazine-1-(thiopropionamide) with xanthydrol affords N-(9-xanthenyl)-3-(4-methyl-piperazine)-thiopropionamide.

EXAMPLE XVII

Xanthydrol (0.01 mole) and methanesulfonamide (0.01 mole) are heated on a steam bath in 5 ml. of acetic acid for five hours. When the reaction is complete, the reaction mixture is evaporated to dryness, dissolved in chloroform and extracted with dilute alkali. The dried chloroform solution is evaporated and the residue recrystallized from ethanol to afford N-(9-xanthenyl)-methanesulfonamide, M.P. 168–170° C.

*Analysis.*—Calc'd for $C_{14}H_{13}O_3NS$: C, 61.09; H, 4.76; N, 5.09. Found: C, 61.20; H, 4.80; N, 5.05.

In a similar manner, N-(9-xanthenyl)-ethanesulfonamide and N-(9-thioxanthenyl)-butanesulfonamide are synthesized.

EXAMPLE XVIII

Xanthydrol (0.02 mole) and thiosemicarbazide (0.02 mole) in 15 ml. of acetic acid are heated on a steam bath for fifteen hours. When the reaction is complete, the reaction mixture is cooled and the precipitated solid separated by filtration to afford 4-(9-xanthenyl)-3-thiosemicarbazide, M.P. 185–187° C.

In a similar manner, reacting thioxanthydrol with thiosemicarbazide affords 4-(9-thioxanthenyl)-3-thiosemicarbazide.

EXAMPLE XIX 4-(9-xanthenyl)-3-thiosemicarbazide (1.0 g.), as prepared above, and 10 ml. of benzaldehyde are dissolved in 20 ml. of methanol and then heated on a steam bath for forty-five minutes. After the reaction is complete, the reaction mixture is cooled, the precipitated product is separated by filtration and recrystallized from ethanol to yield benzaldehyde, 4-(9-xanthenyl)-3-thiosemicarbazone, M.P. 220–221° C.

*Analysis.*—Calc'd for $C_{21}H_{17}N_3OS$: C, 70.18; H, 4.77; N, 11.69; S, 8.91. Found: C, 69.96; H, 4.90; N, 11.31; S, 8.70.

In a similar manner, 4-(9-thioxanthenyl)-3-thiosemicarbazide is reacted with benzaldehyde to afford benzaldehyde, 4-(9-thioxanthenyl)-3-thiosemicarbazone.

EXAMPLE XX

Methyl ethyl ketone (10 ml.) and 4-(9-xanthenyl)-3-thiosemicarbazide (1.0 g.) are refluxed for twelve hours. Thereafter, the reaction mixture is cooled and the precipitated solid separated by filtration. In this manner, is obtained pale yellow crystals of 2-butanone, 4-(9-xanthenyl)-3-thiosemicarbazone, M.P. 183–184° C.

*Analysis.*—Calc'd for $C_{18}H_{19}ON_3S$: C, 66.40; H, 5.88; N, 12.92; S, 9.83. Found: C, 66.33; H, 6.15; N. 12.60; S, 9.80.

In a similar manner, by the interaction of 4-(9-thioxanthenyl)-3-thiosemicarbazide and methyl ethyl ketone there is obtained 2-butanone, 4-(9-thioxanthenyl)-3-thiosemicarbazone.

EXAMPLE XXI

Employing the procedure of Examples XIX and XX to react 4-(9-thioxanthydrol)-3-thiosemicarbazide or 4-(9-xanthydrol)-3-thiosemicarbazide with an appropriate aldehyde or ketone, the following thiosemicarbazones are obtained:

Acetone, 4-(9-thioxanthenyl)-3-thiosemicarbazone;
2-pentanone, 4-(9-xanthenyl)-3-thiosemicarbazone;
4 - chlorobenzaldehyde, 4-(9-xanthenyl)-3-thiosemicarbazone;
3 - bromobenzaldehyde, 4-(9-thioxanthenyl)-3-thiosemicarbazone;
4 - propylbenzaldehyde, 4-(9-xanthenyl)-3-thiosemicarbazone;
4 - methoxybenzaldehyde, 4-(9-thioxanthenyl)-3-thiosemicarbazone;
4 - iodobenzaldehyde, 4-(9-xanthenyl)-3-thiosemicarbazone;
3 - ethoxybenzaldehyde, 4-(9-xanthenyl)-3-thiosemicarbazone;
4 - ethylbenzaldehyde, 4-(9-thioxanthenyl)-3-thiosemicarbazone;
cyclohexanone, 4 - (9-thioxanthenyl)-3-thiosemicarbazone;
cyclopentanone, 4-(9-xanthenyl)-3-thiosemicarbazone;
cycloheptanone, 4-(9-xanthenyl)-3-thiosemicarbazone; and
naphthaldehyde, 4-(9-xanthenyl)-3-thiosemicarbazone.

EXAMPLE XXII

N-(9-xanthenyl)-3-dimethylaminothiopropionamide (0.01 mole) is dissolved in 50 ml. of ethanol and treated with Raney-Ni with shaking under hydrogen pressure in a Parr apparatus (35 lb. sq. in.) for twelve hours. When hydrogenation is complete, the reaction mixture is filtered, evaporated under vacuum, dissolved in ether and treated with an ethanolic solution of fumaric acid. In this manner, is obtained N-[3-(dimethylamino)propyl]xanthen-9-amine fumarate, M.P. 187–187.5° C.

*Analysis.*—Calc'd for $C_{18}H_{22}N_2O \cdot C_8H_8O_8$: C, 60.69; H, 5.88; N, 5.45. Found: C, 61.00; H, 5.70; N, 5.46.

In a similar manner, N-[4-(diethylamino)butyl]-thioxanthen - 9-amine maleate; N-[2-(dibutylamino)ethyl]-xanthen - 9 - amine citrate and N-[6-(dimethylamino) hexyl]-xanthen-9-amine hydrochloride are prepared.

EXAMPLE XXIII

Xanthydrol (0.01 mole) and 4-phenylpiperidine-4-carboxylate, ethyl ester are refluxed in a mixture of 11 ml. of benzene and 1.1 ml. of acetic acid for sixteen hours. The water is azeotropically distilled and separated by a Dean-Stark apparatus. When the reaction is complete, the reaction mixture is cooled and the solid filtered. In this manner is obtained 4-phenyl-1-(9-xanthenyl)isonipecotic acid, ethyl ester which is recrystallized from benzene; M.P. 188.5–189° C.

Analysis.—Calc'd for $C_{27}H_{27}NO_3$: C, 78.42; H, 6.58; N, 3.39. Found: C, 78.41; H, 6.45; N, 3.05.

Similarly, when thioxanthydrol is reacted with 4-phenylpiperidine-4-carboxylate, propyl ester, there is obtained 4-phenyl-1-(9-thioxanthenyl)isonipecotic acid, propyl ester.

EXAMPLE XXIV

When the procedure of Example XXIII is repeated to react xanthydrol or thioxanthydrol with an appropriate piperdine-4-carboxylate ester, the following compounds are obtained:

4-(4-chlorophenyl)-1-(9-xanthenyl)isonipecotic acid, methyl ester;

4-(4-methoxyphenyl) - 1 - (9-thioxanthenyl)isonipecotic acid, ethyl ester;

4-(3-tolyl)-1-(9-xanthenyl)isonipecotic acid, proply ester; and 4-(4-bromophenyl) - 1 - (9-thioxanthenyl)isonipecotic acid, ethyl ester.

What is claimed is:
1. A compound selected from the group consisting of those having the formula:

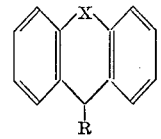

wherein X is selected from the group consisting of sulfur and oxygen and R is selected from the group consisting of
 (a) 4-ethoxycarbonyl-3-methyl-hexahydro - 4-phenyl-azepino carbamoyl;
 (b) 1-allylureido
 (c) morpholinopropionylamino;
 (d) pyrrolidinopropionylamino.

2. A compound as described in claim 1 which is: 1-[N-(9-xanthenyl)-carbamoyl] - hexahydro - 3-methyl-4-phenyl-azepine-4-carboxylic acid, ethyl ester.

3. A compound as described in claim 1 which is: 1-[N-(9-thioxanthenyl)-carbamoyl]-hexahydro - 3-methyl-4-phenylazepine-4-carboxylic acid, ethyl ester.

4. A compound as described in claim 1 which is: 1-allyl-3-thioxanthen-9-ylurea.

5. A compound as described in claim 1 which is: 1-allyl-3-xanthen-9-ylurea.

6. A compound as described in claim 1 which is: N-(9-xanthenyl)-4-morpholinepropionamide.

7. A compound as described in claim 1 which is: N-(9-xanthenyl)-1-pyrrolidinepropionamide.

No references cited.

ALEX MAZEL, Primary Examiner
J. TOVAR, Assistant Examiner

U.S. Cl. X.R.
260—240, 247.1, 247.2, 328, 335; 424—248, 274, 275, 283